UNITED STATES PATENT OFFICE.

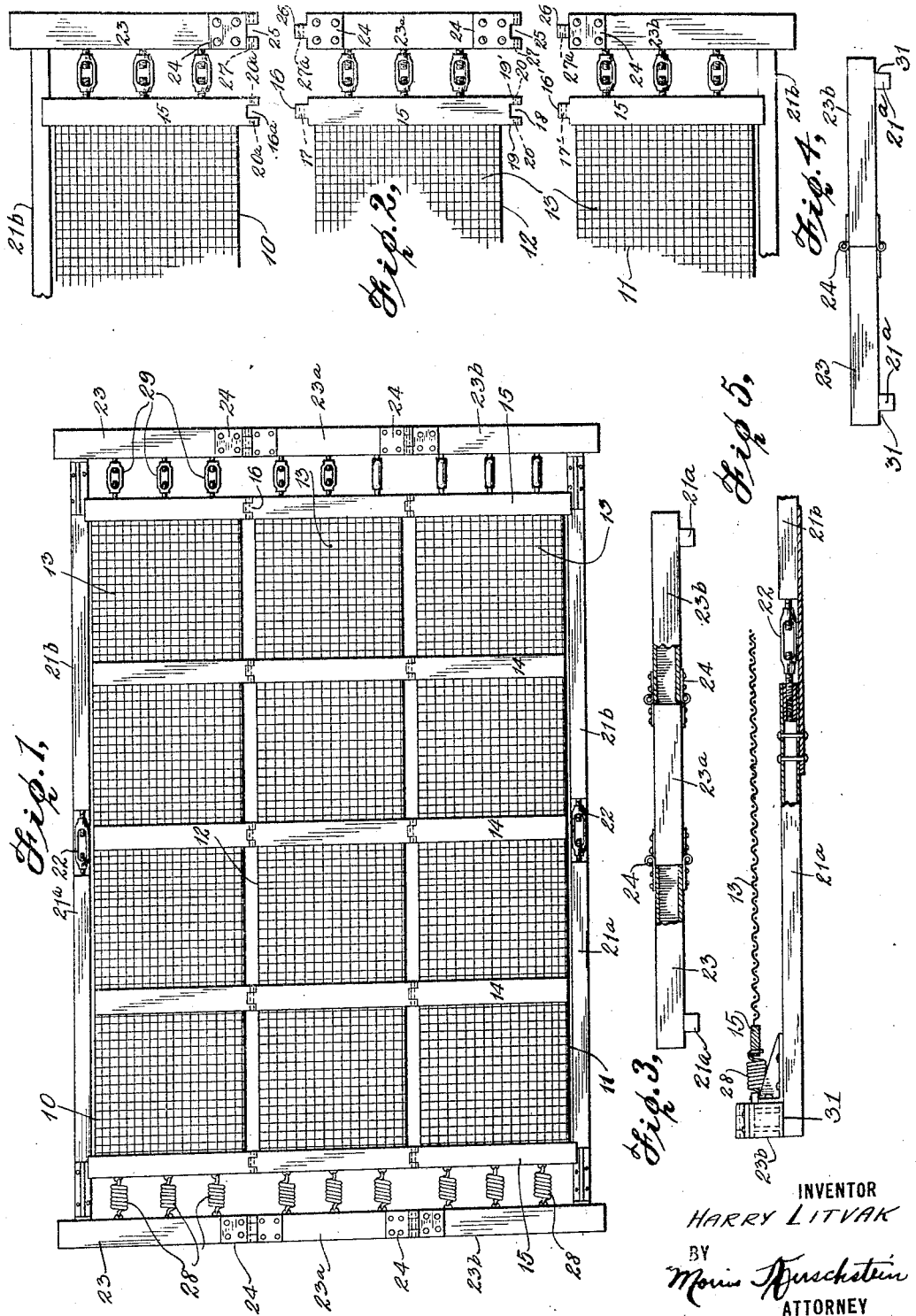

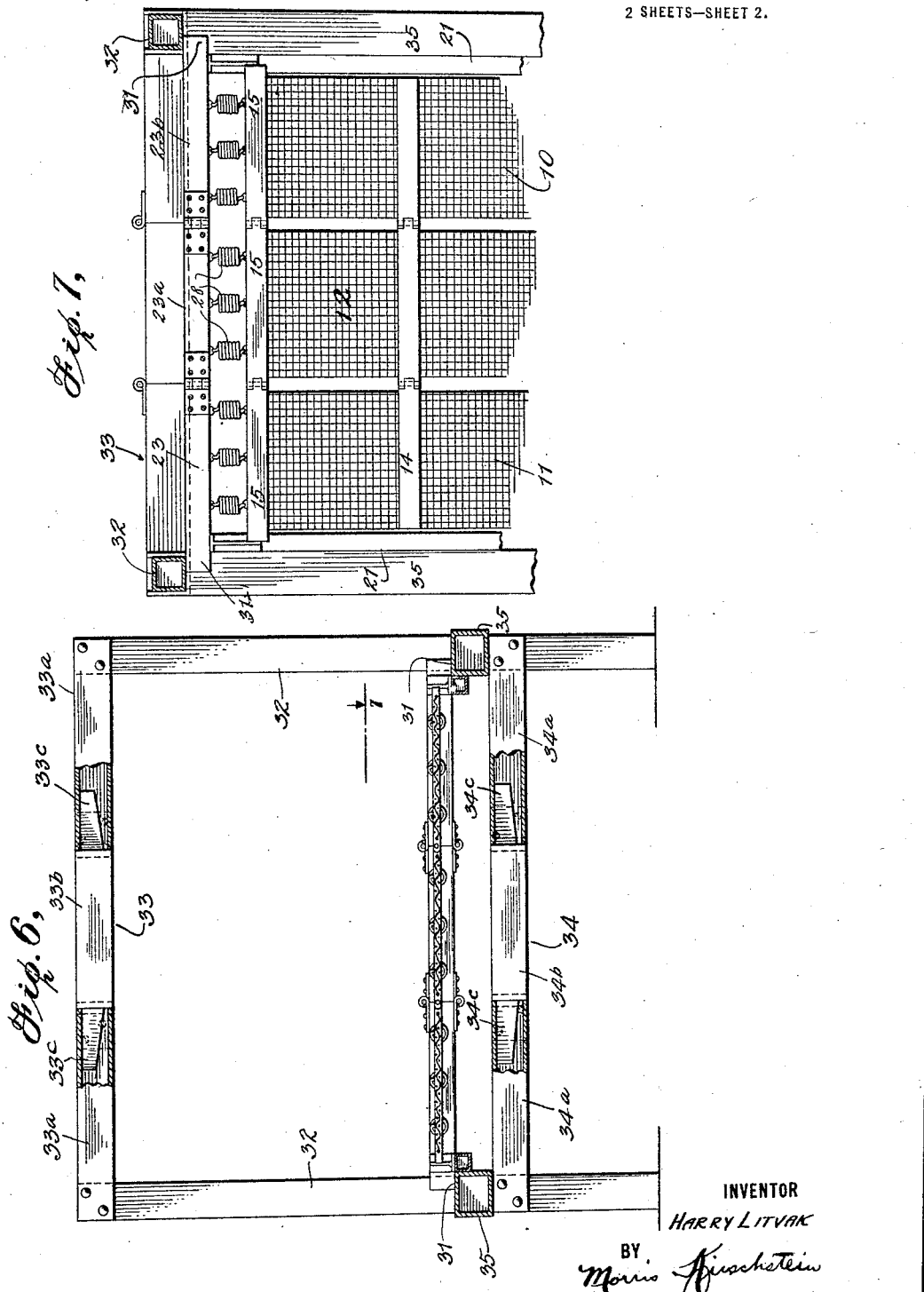

HARRY LITVAK, OF HUDSON, NEW YORK.

BEDSTEAD AND BEDSPRING.

1,411,636.        Specification of Letters Patent.        Patented Apr. 4, 1922.

Application filed February 14, 1921. Serial No. 444,962.

*To all whom it may concern:*

Be it known that HARRY LITVAK, a declarant citizen of the United States, and a subject of the Government of Russia, and resident of the city of Hudson, in the county of Columbia and State of New York, has invented certain new and useful Improvements in Bedsteads and Bedsprings, of which the following is a specification.

This invention relates to combination bed steads and bed springs.

One of the objects thereof is to provide a bed stead and bed spring therefor which may be capable of adjustment as to width of the bed.

Another object is to provide a bed stead and bed spring which may be employed equally well for a smaller and larger width of bed and the construction of which permits of easy assembling of the parts to give the desired width of bed, is simple in operation and comparatively cheap to manufacture.

Another object is to provide a device of this character which may be readily taken apart when not in use.

Other objects of this invention will be in part obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention—

Fig. 1 is a plan view of the bed spring assembled for the larger width of bed;

Fig. 2 is a partial plan view of the bed spring similar to Fig. 1 showing the sections taken apart;

Fig. 3 is an end view of a bed spring partly in section assembled for the larger width;

Fig. 4 is an end view of the bed spring partly in section assembled for the smaller width;

Fig. 5 is a vertical elevational view of the bed spring shown in Fig. 1.

Fig. 6 is an end view of the bed stead and bed spring in place thereon with the parts assembled for the larger width of bed.

Fig. 7 is a corresponding plan view.

Referring in detail to the drawing, the bed spring there shown is made up of two end sections 10 and 11 and an intermediate section 12. More than one such intermediate section may be employed. Each of said sections comprises woven wire portions 13 secured to intermediate brace members or bars 14 and attached at the ends to the end bars 15. The end bars of the intermediate section 12 are formed or provided at one end with a lug or projection 16 having an opening 17. The other end is recessed as at 18 to receive the lug 16' extending from the end bar 15 of the adjoining section. The walls 19, 19' bounding the recess 18 are provided with an opening 20 adapted to register with the opening 17' in the lug 16' so that when the two sections such as for example 11 and 12 are placed together, a pin may be passed through the openings 20 and 17' to hold the lug 16' in the recess 18, and thus secure the sections together. The end bars 15 of the end section 10 are provided at the inner end with a recess $16^a$ corresponding to the lug 16 and the opening $20^a$ for similarly securing this end section to the adjoining intermediate section such as 12, as will be readily understood.

The side members of the spring frame are made in two sections $21^a$ and $21^b$ secured together by intermediate turn buckles 22, which permit longitudinal adjustment of these side members for tensioning the spring sections. The end members of the frame are made in sections 23, $23^a$ and $23^b$ to correspond to the spring sections and are adapted to be hinged together by hinge members 24 secured thereto and having a female portion 25 and a male portion 26 similar to the lug 16 and recess $16^a$ heretofore described in connection with the spring sections. The securing together of interlocking end members of the frame is accomplished in the same way as the securing together of the separate spring sections as for example by means of a pin which passes through the opening 27 which is in registry with the corresponding opening $27^a$. The spring sections are each separately secured to the corresponding end members of the spring frame by means of coil springs 28, or turn-buckles 29. Extending from the end members of the frame are longitudinal rails $21^a$ forming with the end pieces channels 31 for supporting the spring frame on the bed stead.

It will be understood that with the spring construction hereinbefore described, two sections may be used to provide a narrow width of bed as for example the outer sections 23 and 23$^b$ as shown in Fig. 4, or these two sections may be combined with one or more intermediate sections resulting for example in the assembly shown in Fig. 3, from which a greater width of bed results.

The bed stead is shown in Figs. 6 and 7 and comprises end supports or up-rights 32, top and bottom cross-pieces 33, 34 and side pieces 35 extending over the bottom cross-piece. The bed-spring frame is supported by means of the channel 31 on these side pieces 35 as will be clear from Figs. 6 and 7.

The top and bottom cross-pieces are made in sections comprising two end portions 33$^a$ and 34$^a$ respectively. These correspond in length to the width of the end spring sections 10, 11 and are adapted to be hinged together when these spring sections are employed for the smaller width of bed. Intermediate sections 33$^b$ and 34$^b$ respectively are provided for each of the cross-pieces and adapted to enter into the end sections 33$^a$ and 34$^a$ and removably engage frictionally therewith by means of projecting portions 33$^c$, 34$^c$. These intermediate sections are employed when these spring sections are assembled together to provide the larger width of bed. The cross pieces 33, 34 may be unhinged and disassembled when desired and the spring sections taken apart and the bed thus completely collapsed.

It will thus be seen that there is provided apparatus in which the several objects of this invention are achieved and which is well adapted to meet the most severe conditions of practical use.

As various possible embodiment might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

A bed bottom comprising end rails and side rails and a spring body attached thereto, said spring body comprising a plurality of sections detachably secured to each other, end members secured to the ends of each of said sections, means for attaching said end members to said end rails, intermediate brace members adapted to hold said spring sections together, and means on said intermediate brace members and end members whereby one or more of said spring sections may be included or omitted.

Signed at the city of Hudson, in the county of Columbia and State of New York, this 25th day of January, A. D. 1921.

HARRY LITVAK.

Witness:
WM. WALLACE CHACE.